Jan. 13, 1959    A. T. VAN URK ET AL    2,869,050
MAGNETIC CIRCUITS
Original Filed Jan. 4, 1952
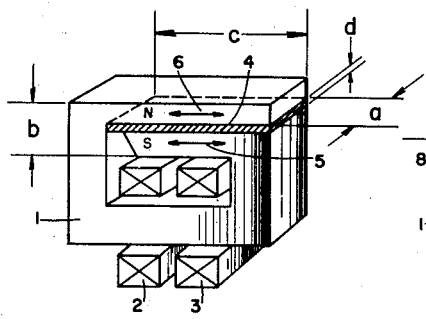
Fig. I
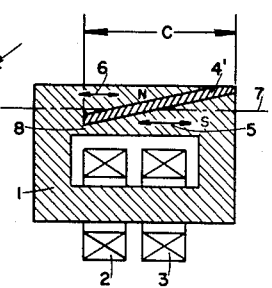
Fig. 2
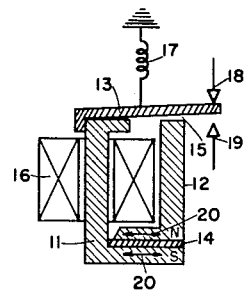
Fig. 3
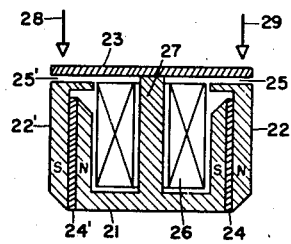
Fig. 4
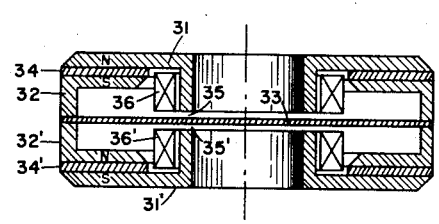
Fig. 5
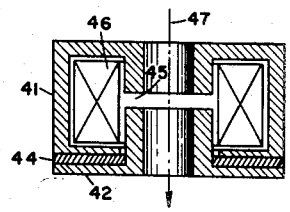
Fig. 6
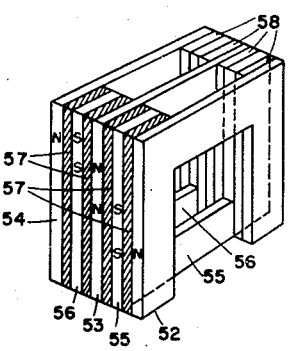
Fig. 7
*INVENTORS*
AREND THOMAS VAN URK
JOHANNES MEYER CLUWEN
BY
AGENT United States Patent Office 2,869,050
Patented Jan. 13, 1959

2,869,050
MAGNETIC CIRCUITS

Arend Thomas van Urk and Johannes Meyer Cluwen, Eindhoven, Netherlands, assignors, by mesne assignments to North American Philips Company, Inc., New York, N. Y., a corporation of Delaware Continuation of applications Serial Nos. 264,980 and 264,981, January 4, 1952. This application June 20, 1956, Serial No. 592,573.

13 Claims. (Cl. 317—171)

This invention relates to permanent-magnet-biased, closed, magnetic circuits.

Magnetic circuits of the foregoing type generally comprise a soft magnetic core member defining a closed magnetic circuit, a winding on the core member, and a permanent magnet located in series in the magnetic circuit and establishing a predetermined, biasing or premagnetizing magnetic field in the circuit. The permanent magnet is arranged such that its magnetizing direction coincides with the flux direction in the adjacent portions of the core, and such that the pole surfaces on the magnet extend at right angles to the length direction of, or flux direction in, the adjacent core portions. One of the chief disadvantages of this arrangement is that the dimensions of the core cross-section limit the dimensions of the permanent magnet which can be included in the circuit. Thus, if it becomes necessary to increase the biasing field in the circuit, which usually requires a larger-sized magnet, it may become necessary to increase the size of the core cross-section to accommodate the larger magnet, even though not demanded by the usual saturation requirements. This, of course, is wasteful of magnetic material and thus uneconomical.

One object of the present invention is to provide a closed magnetic circuit including a core member and a permanent magnet for premagnetizing the core, in which the cross-section of the core does not constitute a limitation on the size of the permanent magnet in the circuit.

A further object of the present invention is the provision of a closed magnet circuit containing a permanent magnet producing therewithin a more intense premagnetizing field than was heretofore possible for the same size circuit.

Still another object of the invention is the provision of a closed magnetic circuit containing a permanent magnet establishing a high premagnetizing field therein and also having a winding for producing an alternating magnetic field in the circuit, wherein the reluctance of the circuit to the alternating flux remains low, despite the presence of the permanent magnet.

A further object of the invention is the provision of a closed magnet circuit containing a working air-gap and a coil for establishing a magnetic field in the air-gap, wherein a permanent magnet is provided within the magnetic circuit in such position that a very intense biasing field in the air-gap is produced, yet the reluctance to flux flow in the circuit offered by the magnet remains low.

The construction of the invention wherein these and other objects of the invention may be realized involves, briefly, the provision of a permanent magnet exhibiting a coercive force of at least 750 oersteds, having a thin, substantially flat form and being magnetized in its thinness direction, and mounting of the permanent magnet in series with a highly-permeable, core member to form a closed magnetic circuit containing at least one winding and in such manner that the length direction of the magnet coincides substantially with the length direction of a portion of the core, whereby the magnetization direction of the magnet extends substantially at right angles to the flux direction in said core portion. By this arrangement of magnet and core, a considerably larger magnet may be accommodated in the magnetic circuit, enabling the obtainment of a more intense premagnetizing field, while the overall reluctance to the flux flow through the circuit remains low.

The invention will now be described in greater detail with reference to the accompanying drawing, wherein:

Fig. 1 is a perspective view, also partly in cross-section, of a transformer in accordance with the invention;

Fig. 2 is a cross-sectional view of a modification of the transformer illustrated in Fig. 1;

Fig. 3 is a cross-sectional view of a relay in accordance with the invention;

Fig. 4 is a cross-sectional view of a modification of the relay shown in Fig. 3;

Fig. 5 is a cross-sectional view of a magnetic telephone constructed in accordance with the invention;

Fig. 6 is a cross-sectional view of a magnetic electron lens constructed in accordance with the invention, and Fig. 7 is a perspective view of a further modification of the construction illustrated in Fig. 1.

Referring now to the drawing, Fig. 1 illustrates one form of magnetic circuit in accordance with the invention. The particular form illustrated is a transformer. It comprises a closed core member 1 constituted of soft ferromagnetic material of high permeability. The latter may be soft iron or one of the well-known ferromagnetic ferrite materials. A portion of the core 1 is surrounded by a pair of windings serving, respectively, as primary 2 and secondary 3 windings. A straight, thin, flat, permanent magnet 4, shown cross-hatched, is mounted within an elongated portion of the core 1. The permanent magnet 4 has a length dimension $c$, a width dimension $a$, and a thickness dimension $d$ considerably smaller than either of the other two dimensions. The permanent magnet 4 is magnetized in the direction of its thickness dimension $d$, thereby producing poles on the upper and lower surfaces thereof. These poles are represented by the N and S in Fig. 1. The area of each of the pole surfaces of the magnet 4 is equal to the product of $a$ and $c$. The length $c$ of the magnet is substantially greater than the width $b$ of the elongated core portion, and thus the pole surface area of the magnet 4 is substantially greater than the cross-sectional area of the core portion, which is the product of $a$ and $b$. The magnet 4 is constituted of permanent magnet material exhibiting a high coercive field strength $_BH_C$, preferably of at least 750 oersteds. Further, the permanent magnet 4 is preferably constituted of one of the permanent magnet materials described in British Patent 708,127, which materials are characterized by a hexagonal crystal structure and consist essentially of a composite oxide of iron and of at least one metal selected from the group consisting of barium, strontium and lead. The advantages of this material are: (1) its high resistivity, since it is oxidic, which reduces eddy current losses to a minimum; (2) its low ratio, preferably below 4, of remanence in gauss to coercive force $_BH_C$ in oersteds, which reduces hysteresis losses; (3) its extreme resistance to demagnetization. In connection with the latter, a magnet constituted of such material may actually be subjected to a demagnetizing field equal in value to its coercive force $_BH_C$ without suffering any appreciable loss in its magnetization. In addition, the magnet may also be magnetized outside of the magnetic circuit and subsequently included in the latter, again without any material loss of its magnetic strength. However, the invention is not limited to oxidic permanent magnets, and the usual metallic magnets may be employed, provided that they are of the high coercive force type exhibiting a coercive force of at least 750 oersteds.

In operation, an alternating current voltage is applied to the primary winding 2, which causes alternating flux to flow through the core 1. In the upper portion of the core 1, the flux will flow essentially horizontally, as shown by the arrows 5 and 6, and cross the permanent magnet 4 in order to complete the circuit, and thus the magnet 4 is in series with the core portions above and below it. It will be observed that the magnet 4 is mounted within that core portion such that its length dimension c extends substantially in the longitudinal direction of the core portion, i. e., horizontally in the figure, and that the direction of magnetization of the magnet 4, i. e., in the d or thickness direction, is substantially at right angles to the main flux flow through that core portion. In short, the magnet 4 in the construction of the invention is mounted substantially at right angles to the prior art arrangement of core and magnet, in the latter of which the direction of magnetization of the magnet coincides with the path of flux flow through the circuit. However, this right-angle positioning of the magnet within the core structure offers important advantages over the prior art arrangement. In particular, the size of the cross-section of the core portion no longer constitutes a limitation on the size of the permanent magnet, since the latter now extends substantially in the longitudinal direction of the core portion and not transverse thereto. Further, the reluctance offered by the permanent magnet to alternating flux flow through the circuit remains low. As a consequence of the above, a closed magnetic circuit is afforded wherein more intense premagnetizing fields may obtain and wherein reluctance to flux flow remains low.

Fig. 2 shows a modification of the construction of Fig. 1. In this modification, the straight, permanent magnet 4' is mounted in an elongated portion of the core 1 such that it is slightly oblique relative to the longitudinal axis 7 of the core portion. However, the longitudinal direction c of the magnet 4' still extends substantially in the longitudinal direction of the core portion in which it is mounted, i. e., the horizontal direction in Fig. 2. The magnet 4', similar to Fig. 1, is also magnetized in the direction of its thinnest dimension producing poles, indicated by N and S, on its upper and lower flat surfaces. It will also be observed that the magnet 4' does not completely separate portions of the core 1, but a small portion 8 of the core 1 shunts the magnet 4'. Such a construction may be valuable where the soft material constituting the core 1 has a low value of saturation, and it may be desirable to provide means 8 for shunting excess magnetic flux around the permanent magnet 4' to reduce the possibility of a shift in the characteristics of the permanent magnet. The flux in the upper portion of the core 1 is designated, again, by arrows 5 and 6. This construction also has the advantage over that of Fig. 1 of reducing the flux concentration at the upper corners of the core.

The constructions illustrated in Figs. 1 or 2 may be useful in many ways. For example, it may be used as a magnetic modulator—it would then contain three windings—wherein the biasing field produced by the magnet 4 drives the core 1 nearly to saturation, i. e., to the knee of its B–H characteristic. The constructions illustrated may also be employed as a transformer, wherein one of the primary windings carries current including a D.-C. component. By establishing a biasing field by the magnet 4 in the core 1, the D.-C. field resulting from the D.-C. component of the current traversing the primary winding can be completely compensated. In the same manner, by elimination of one of the windings, a choke will result, wherein premagnetization may be employed to compensate for a D.-C. field established in the core by a D.-C. current component.

A further important application of this construction is as a pulse transformer, where the biasing field of the magnet establishes saturation of the core 1 in one direction, and the primary winding is driven by a pulse of such magnitude as to cause the flow of flux in the core 1 to reverse and establish saturation of the latter in the opposite direction, which thus permits the application of larger pulses to the primary winding. A system of this general type is described and claimed in a copending application, Serial No. 445,068, filed July 22, 1954.

In constructing the circuit of Fig. 1, the thickness d of the magnet is determined by the saturation of the core material 1 and by the overall length of the circuit. By employing the high coercive force permanent magnet, the thickness d remains small and thus also the overall size of the transformer.

It will be observed that the constructions of Figs. 1 and 2 concern a magnetic circuit without an air-gap. This construction is defined as a completely closed magnetic circuit, i. e., one not containing an air-gap. It will also be realized that for certain applications, it may be desirable to introduce further reluctance in the circuit. To this end, a narrow air-gap may be provided in series in the magnetic circuit in one of the portions of the core. In this latter circumstance, the magnetic circuit is still a closed circuit, though not completely closed, because the return path for all generated flux is provided by ferromagnetic material.

There is still another circumstance in which an air-gap is necessary in the magnetic circuit. This is where the air-gap is employed for causing interaction between the magnetic flux and some other device, such as an armature member or means providing a path for charged particles. In this case, the air-gap is known as a "working" air-gap.

Figs. 3 to 6 illustrate several magnetic circuits, all closed, containing a working air-gap. In particular, Fig. 3 shows a polarized relay comprising a soft ferromagnetic core including portions designated 11 and 12. A movable, soft ferromagnetic armature 13 is pivoted at the upper end of the core portion 11 and defines with the upper end of the core portion 12 a working air-gap 15. A winding 16 encircles the core portion 11. Relay contacts 18 and 19 are located on opposite sides of the armature 13. By means of a spring 17, the armature 13 is urged into contact with the upper relay contact 18. A thin, flat, straight magnet 14 is mounted in series in the closed magnetic circuit between the core portions 11 and 12. As indicated before, the permanent magnet 4 has a coercive field strength of at least 750 oersteds and is magnetized in the direction of its smallest dimension—vertically in Fig. 3—to produce poles indicated by N and S on its upper and lower surfaces, respectively.

In operation, the permanent magnet 14 establishes in the working air-gap 15 a magnetic field opposite in polarity and equal in magnitude to that established by some normal value current traversing the coil 16. Thus, by the passage of a small additional current through the coil 16, sufficient additional flux will be established in the gap to cause the armature to close the gap, thereby breaking the connection to contact 18 and establishing a new connection with contact 19. Thus, the relay is actuated only when the current through the coil 16 exceeds the normal amount and its sensitivity to the additional current is high.

It will also be observed that the magnet 14 is straight and extends in a direction approximately parallel to the magnetic lines of force produced by winding 16 in the core portions 11 and 12. That is to say, the flux due to the winding 16 in the bottom, horizontal core portion will be flowing substantially in a horizontal direction, as indicated by arrows 20. The magnetization of the magnet—vertically—is such that poles are produced on its top and bottom surfaces, which extend substantially horizontally and thus parallel to the principal lines of force 20 in the bottom core portion. This construction has the advantages that the straight form of the magnet 14 is relatively simple to manufacture. Further, a low reluctance to the flow of flux lines is offered by this arrangement of the magnet in the core, thereby ensuring a high sensitivity. It will be obvious also that by controlling the tension of the spring 17, as well as the strength of the magnet 14, various other operations of the construction illustrated may be obtained. Finally, it will be observed that the thickness dimension of the magnet 14—its vertical direction—is substantially smaller than its length dimension—horizontally in the figure—or its width dimension—in a direction at right angles to the plane of the drawing. The magnet 14 also has a thickness substantially smaller than the width—vertically in the figure—of the bottom core portion in which it is mounted.

The device shown in Fig. 4 is similar to that illustrated in Fig. 3. It comprises a relay construction employing a core 21 including a central leg 27, surrounded by a winding 26, and right and left legs 22 and 22'. An armature 23, defining with the outer legs two working air-gaps 25 and 25', completes the magnetic circuit. The armature 23 is pivoted at the center, and cooperates with relay contacts 28 and 29 depending upon whether it pivots to the left or to the right. A pair of permanent magnets 24 and 24', each magnetized, similar to Fig. 3, at right angles to its thickness direction, i. e., horizontally in Fig. 4, are mounted in the core, each in one of the outer legs 22 and 22', in such manner that they extend substantially in the longitudinal direction thereof.

The magnet 24 produces a field $H_1$ in the gap 25, and the magnet 24' a field $H_2$ in the gap 25'. The field produced when current of a certain magnitude traverses the coil 26 in each of the gaps is H. Thus, in gap 25 exists field $H+H_1$, and in gap 25' exists field $H-H_2$, due to the opposite directions of magnetization of the magnets. The total force acting on the armature 23 is thus $(H+H_1)^2-(H-H_2)^2$. If the strength of the magnets 24 and 24' are equal, the armature 23 will engage contact 29 when a positive current passes through the winding 26, and contact 28 when a negative current passes through the winding 26. It will also be obvious that another type of operation can be obtained by making the strengths of the magnets unequal to one another, thus providing two different premagnetizations in the circuit.

Fig. 5 shows a construction according to the invention functioning as a magnetic telephone. It comprises a cylindrical-symmetrical, closed, magnetic circuit including annular core portions 31, 31', 32 and 32' defining central, working, air-gaps 35 and 35'. A magnetic diaphragm 33 is mounted in the gaps. Annular, flat, permanent magnets 34 and 34', magnetized in their thickness direction—vertically in Fig. 5—are mounted in the core portions so as to extend in the longitudinal direction thereof. Coils 36 and 36' suround a central core portion. Due to the opposite directions of magnetization, the force exerted on the diaphragm 33 is proportional to 4 HoH, where Ho is the field in the gap produced by each of the magnets, and H is the field established by each of the coils. Thus, the telephone illustrated has a high sensitivity.

Fig. 6 shows a further embodiment comprising a magnetic electron lens. It comprises a hollow, cylindrical-symmetrical core 41 containing a flat, thin, annular magnet 44 magnetized in its thickness direction—vertically in the figure. This magnet establishes a fixed field in a working air-gap 45 of the closed magnetic circuit shown. A coil 46 supplies additional field for the gap and also permits the total field to be varied as desired. The device shown in Fig. 6 may be placed over the neck of a cathode-ray tube to cause focussing of the electron beam therein as it traverses the field established in the gap 45. The arrow 47 indicates the direction of the electron beam.

Fig. 7 shows a further embodiment of the invention wherein a plurality of permanent magnets are included in the magnetic circuit to attain a high degree of biasing. The embodiment shown comprises a transformer of which only the core structure is shown. The core comprises a plurality of U-shaped, soft, ferromagnetic laminations 52, 53 and 54 mounted such that the open end of the U faces downwardly. Sandwiched in between these U-shaped members are two additional U-shaped, soft, ferromagnetic members 55 and 56 mounted such that the open ends of their U face upwardly. In the left-hand leg of the core are also mounted four thin, flat, straight magnets 57 so as to extend substantially in the longitudinal direction of the leg. The magnets, shown cross-hatched, are each magnetized in the direction of their smallest dimension but in opposite directions and in an alternate manner to produce poles indicated by N and S in the drawing. To maintain the symmetry, the spaces in the right-hand leg of the core are filled with soft, ferromagnetic members 58. The windings (not shown) encircle this right-hand leg. It will be observed that the directions of magnetization of the permanent magnets are such that the fluxes produced thereby are in additive relationship in the soft core portions. Thus, by this configuration, a large premagnetization field is produced in the right-hand leg of the transformer.

This application is a continuation of two copending applications, Serial Nos. 264,980 and 264,981, both filed January 4, 1952, and both now abandoned.

While we have described our invention in connection with specific embodiments and applications, other modifications thereof will be readily apparent to those skilled in this art without departing from the spirit and scope of the invention as defined in the appended claims.

What is claimed is:

1. An electromagnetic device comprising a closed magnetic circuit including a ferromagnetic core, a coil surrounding said core and producing lines of force therein when energized, said core having an elongated portion of a given width wherein the lines of force produced by said coil extend substantially in the longitudinal direction thereof and substantially at right angles to the width, and a thin, flat, permanent magnet having end surfaces, a length dimension in the plane of one of said end surfaces and a thickness dimension at right angles to the plane of said one end surface and consisting essentially of a material having a coercive field strength of at least 750 oersteds, the thickness dimension of said magnet being substantially smaller than its length dimension and substantially smaller than the width of said elongated core portion, said magnet being magnetized in the direction of its thickness producing poles on its end surfaces, said magnet being mounted within the elongated core portion with its length dimension extending substantially in the longitudinal direction of the elongated core portion and with its thickness direction extending substantially in the width direction of the elongated core portion, whereby the poles of the magnet extend substantially in the direction of the lines of force in said elongated core portion and portions of the elongated core portion extend alongside the magnet and the overall reluctance to the lines of force produced by said coil is minimized, said permanent magnet producing lines of force in said core.

2. An electromagnetic device comprising a closed magnetic circuit including an air-gap and a ferromagnetic core, a coil surrounding said core and producing lines of force therein when energized and which traverse the air-gap, said core having an elongated portion of a given width wherein the lines of force produced by said coil extend substantially in the longitudinal direction thereof and substantially at right angles to the width, and a thin flat permanent magnet having end surfaces, a length dimension in the plane of one of said end surfaces and a thickness dimension at right angles to the plane of said one end surface and consisting essentially of a material having a coercive field strength of at least 750 oersteds, the thickness dimension of said magnet being substantially smaller than its length dimension and substantially smaller than the width of said elongated core portion, said magnet being magnetized in the direction of its thickness producing poles on its end surfaces, said magnet being mounted within the elongated core portion with its length dimension extending substantially in the longitudinal direction of the elongated core portion and with its thickness direction extending substantially in the width direction of the elongated core portion, whereby the poles of the magnet extend substantially in the direction of the lines of force in said elongated core portion and portions of the elongated core portion extend alongside the magnet and the overall reluctance to the lines of force produced by said coil is minimized, said permanent magnet also producing lines of force which traverse the air-gap.

3. An electromagnetic device as claimed in claim 2 wherein the permanent magnet consists essentially of non-cubic crystals of a polyoxide of iron and at least one of the metals selected from the group consisting of barium, strontium and lead.

4. An electromagnetic relay device comprising a closed magnetic circuit including an air-gap and a ferromagnetic core, a coil surrounding said core and producing lines of force therein when energized and which traverse the air-gap, said core having an elongated portion of a given width constituted of a pair of spaced ferromagnetic parts wherein the lines of force produced by said coil extend substantially in the longitudinal direction thereof and substantially at right angles to the width of the core portion, and a thin flat permanent magnet having end surfaces, a length dimension in the plane of one of said end surfaces and a thickness dimension at right angles to the plane of said one end surface and consisting essentially of a material having a coercive field strength of at least 750 oersteds, the thickness dimension of said magnet being substantially smaller than its length dimension and substantially smaller than the width of said elongated core portion, said magnet being magnetized in the direction of its thickness producing poles on its end surfaces, said magnet being mounted within the elongated core portion between and abutting the spaced ferromagnetic parts with its length dimension extending substantially in the longitudinal direction of the elongated core portion and with its thickness direction extending substantially in the width direction of the elongated core portion, whereby the poles of the magnet extend substantially in the direction of the lines of force in said elongated core portion and portions of the elongated core portion extend alongside the magnet and the overall reluctance to the lines of force is minimized, said permanent magnet also producing lines of force which traverse the air-gap.

5. An electromagnetic relay device as set forth in claim 4 wherein the magnetic circuit includes a biased movable armature member defining with said core said air-gap.

6. An electromagnetic device comprising a closed magnetic circuit including two air-gaps and a ferromagnetic core, a coil surrounding said core and producing lines of force therein when energized and which traverse the air-gaps, said core having a pair of elongated portions of a given width wherein the lines of force produced by said coil extend substantially in the longitudinal direction thereof and substantially at right angles to the width, and a pair of thin flat permanent magnets each having end surfaces, a length dimension in the plane of one of said end surfaces and a thickness dimension at right angles to the plane of said one end surface and consisting essentially of a material having a coercive field strength of at least 750 oersteds, the thickness dimension of each of said magnets being substantially smaller than its length dimension and substantially smaller than the width of said elongated core portion, each of said magnets being magnetized in the direction of its thickness producing poles on its end surfaces, each of said magnets being mounted within one of the elongated core portions with its length dimension extending substantially in the longitudinal direction of the elongated core portion and with its thickness direction extending substantially in the width direction of the elongated core portion, whereby the poles of the magnet extend substantially in the direction of the lines of force in said elongated core portion and portions of the elongated core portion extend alongside each of the magnets and the overall reluctance to the lines of force produced by said coil is minimized, each of said permanent magnets producing lines of force which traverse one of said air-gaps.

7. An electromagnetic device as set forth in claim 6 wherein the permanent magnets are of different strength and produce different amounts of lines of force in their associated air-gap.

8. An electromagnetic device as set forth in claim 6 wherein a diaphragm is mounted within the air-gaps.

9. An electromagnetic device comprising a closed magnetic circuit and a coil wound about a portion of said magnetic circuit for producing a magnetic field therein, said magnetic circuit comprising a core constituted of ferromagnetic material having a high permeability, a portion of said core having a longitudinal axis in a given direction and a given cross-sectional area at right angles to said longitudinal axis, and a straight, flat permanent magnet having length and width dimensions defining a larger surface area than the given cross-sectional area of said core portion, said permanent magnet being disposed within said core portion with its length dimension extending substantially in the direction of the longitudinal axis of the core portion for establishing within said core a predetermined, premagnetizing field, said permanent magnet having a thickness dimension perpendicular to and smaller than its length and width dimensions, said permanent magnet also having a direction of magnetization parallel to said thickness dimension and consisting essentially of a material having a coercive field strength of at least 750 oersteds.

10. An electromagnetic device as set forth in claim 9 wherein the magnetic circuit is completely closed and the coil establishes an alternating magnetic field in the core.

11. An electromagnetic device as set forth in claim 10 wherein a pair of coils are wound about said circuit.

12. An electromagnetic device as set forth in claim 9, wherein the permanent magnet material has a hexagonal crystal structure and consists essentially of a composite oxide of iron and one of the metals selected from the group consisting of barium, strontium, and lead.

13. An electromagnetic device comprising a closed magnetic circuit and a coil wound about a portion of said magnetic circuit for producing an alternating magnetic field therein, said magnetic circuit comprising a plurality of U-shaped stacked laminations each having limbs and each comprising ferromagnetic material having a high permeability, said laminations being stacked with the open ends of the limbs of alternate laminations facing in opposite directions, alternate laminations being separated by a thin permanent magnet disposed therebetween for producing in the laminations a premagnetizing field of given intensity, each of said permanent magnets having given length and width dimensions defining a given surface area which is larger than the cross-sectional area of a limb of a lamination, said length dimension being substantially in the direction of said limb, each of said permanent magnets having a thickness dimension perpendicular to and smaller than said length and width dimensions, each of said permanent magnets having a direction of magnetization parallel to its thickness dimension and consisting essentially of a material having a coercive field strength of at least 750 oersteds, adjacent magnets being magnetized in opposite directions.

References Cited in the file of this patent

UNITED STATES PATENTS

| | | |
|---|---|---|
| 378,320 | Kennedy | Feb. 21, 1888 |
| 1,176,421 | Beach | Mar. 21, 1916 |
| 1,645,304 | Slepian | Oct. 11, 1927 |
| 1,896,510 | Given | Feb. 7, 1933 |
| 2,000,378 | Deisch | May 7, 1935 |
| 2,103,303 | Steenbeck | Dec. 28, 1937 |
| 2,170,694 | Perry | Aug. 22, 1939 |
| 2,209,051 | Clayton | July 23, 1940 |
| 2,375,017 | Marrison | May 1, 1945 |
| 2,375,586 | Romer | May 8, 1945 |
| 2,381,763 | McCreary | Aug. 7, 1945 |
| 2,503,243 | Cohen | Apr. 11, 1950 |
| 2,724,075 | Van Urk et al. | Nov. 15, 1955 |
| 2,727,192 | Rinia et al. | Dec. 13, 1955 |
| 2,774,935 | Rademakers et al. | Dec. 18, 1956 |

FOREIGN PATENTS

| | | |
|---|---|---|
| 425,530 | Germany | Feb. 25, 1926 |
| 155,370 | Australia | Dec. 13, 1951 |